(12) United States Patent
Horst et al.

(10) Patent No.: US 11,402,577 B2
(45) Date of Patent: Aug. 2, 2022

(54) ANALOG OPTIC MEMORY AND SIGNAL PROCESSING

(71) Applicant: International Business Machines Corporation, Armonk, NY (US)

(72) Inventors: Folkert Horst, Wettingen (CH); Roger F. Dangel, Luessirainstrasse (CH); Bert Jan Offrein, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 16/832,082

(22) Filed: Mar. 27, 2020

(65) Prior Publication Data

US 2021/0302653 A1  Sep. 30, 2021

(51) Int. Cl.
| | |
|---|---|
| *G02B 6/122* | (2006.01) |
| *G02B 6/02* | (2006.01) |
| *G06N 3/067* | (2006.01) |
| *G01N 21/17* | (2006.01) |
| *G02B 6/26* | (2006.01) |

(52) U.S. Cl.
CPC ....... *G02B 6/1221* (2013.01); *G01N 21/1717* (2013.01); *G02B 6/02133* (2013.01); *G02B 6/26* (2013.01); *G06N 3/0675* (2013.01)

(58) Field of Classification Search
None
See application file for complete search history.

(56) References Cited

U.S. PATENT DOCUMENTS

| | | | | |
|---|---|---|---|---|
| 5,719,974 A | * | 2/1998 | Kashyap | G02B 6/4237 385/37 |
| 2013/0022352 A1 | * | 1/2013 | Yamashita | H04J 14/0212 398/34 |
| 2015/0036971 A1 | | 2/2015 | Way et al. | |
| 2016/0047991 A1 | | 2/2016 | Mehrvar | |

(Continued)

OTHER PUBLICATIONS

Soref et al., "Mach-Zehnder crossbar switching and tunable filtering using N-coupled waveguide Bragg resonators," Optics Express, Research Article, vol. 26, No. 12, Jun. 11, 2018, 13 pages.

(Continued)

*Primary Examiner* — Chad H Smith
(74) *Attorney, Agent, or Firm* — Rachel M. Yadlosky

(57) ABSTRACT

A method, system, and computer program product for using photorefractive material for analog optic storage and other applications of optical neuromorphic systems. The method may include coupling electromagnetic radiation into a first optical input and a second optical input, where the first optical input and the second optical input are part of an integrated optical device, the integrated optical device including: a first optical mode coupler connected to a first pair of optical ports including a first optical input and output; a second optical mode coupler connected to a second pair of optical ports including a second optical input and output, and the first optical mode coupler connected to the second optical mode coupler using a pair of arms (including a photorefractive material). The method may also include obtaining an optical interference pattern in the photorefractive material of each arm of the integrated optical device.

10 Claims, 14 Drawing Sheets

(56) References Cited

U.S. PATENT DOCUMENTS

2016/0238795 A1 8/2016 Tan et al.
2019/0370652 A1* 12/2019 Shen .................... G06N 3/0454

OTHER PUBLICATIONS

Shen et al., "Deep learning with coherent nanophotonic circuits," Nature Photonics, Published Online: Jun. 12, 2017, 7 pages, DOI: 10.1038/NPHOTON.2017.93.

Owechko et al., "Holographic Neurocomputer Utilizing Laser-Diode Light Source," Proceedings of the SPIE, vol. 2565, Optical Implementation of Information Processing, (Aug. 28, 1995), 9 pages, DOI: 10.1117/12.217654.

Burr et al., "Large-scale neural networks implemented with non-volatile memory as the synaptic weight element: comparative performance analysis (accuracy, speed, and power)," IEEE, 2015, 4 pages.

Gokmen et al., "Acceleration of Deep Neural Network Training with Resistive Cross-Point Devices: Design Considerations," CrossMark, Frontiers in Neuroscience, vol. 10, No. Jul. 2016, 13 pages.

* cited by examiner

ANALOG OPTIC MEMORY AND SIGNAL PROCESSING

BACKGROUND

The present disclosure relates to the field of integrated optical devices and systems comprising arrays of such devices and, more specifically, to the use of photorefractive materials for analog optical storage and other applications of optical neuromorphic systems. The present optical devices and systems can, for instance, advantageously be used as integrated optics synaptic elements in a neuromorphic system.

Machine learning may often rely on artificial neural networks (ANNs), which are computational models inspired by biological neural networks in human or animal brains. An ANN may include a set of connected units or nodes, called artificial neurons. Signals may be transmitted along connections (also called edges) between artificial neurons, similar to synapses. That is, an artificial neuron that receives a signal may process it and then may signal connected neurons. Connection weights (also called synaptic weights) may be associated with the connections and nodes. Each neuron may have several inputs and a connection weight may be attributed to each input (the weight of that specific connection). A weight may serve as a scaling parameter and may determine how strongly a source neuron affects a destination neuron. Such weights may adjust as learning proceeds.

SUMMARY

The present invention provides a computer-implemented method, system, and computer program product for using photorefractive material for analog optic storage and other applications of optical neuromorphic systems. The method may include coupling electromagnetic radiation into each of a first optical input and a second optical input, and where the first optical input and the second optical input are part of an integrated optical device, the integrated optical device including: a first optical mode coupler connected to a first pair of optical ports, where the first pair of optical ports includes a first optical input and a first optical output; a second optical mode coupler connected to a second pair of optical ports, where the second pair of optical ports includes a second optical input and a second optical output, and the first optical mode coupler connected to the second optical mode coupler using a pair of arms, where each arm includes a photorefractive material. The method may also include obtaining an optical interference pattern in the photorefractive material of each arm of the integrated optical device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
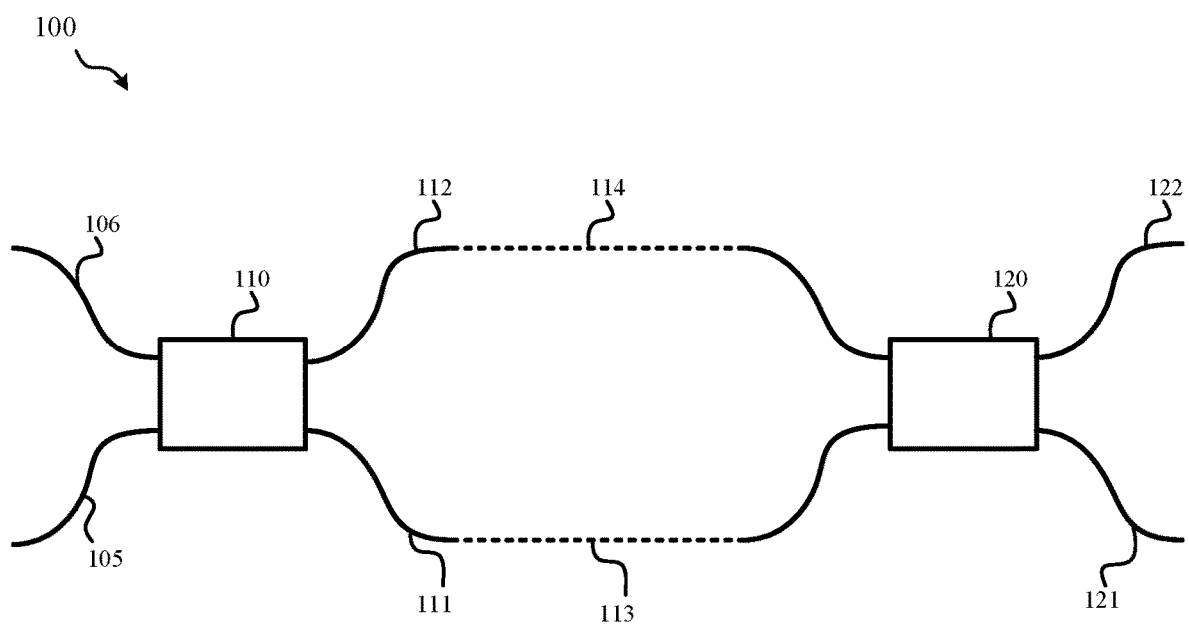
FIG. 1 depicts an example integrated optical device, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the field of integrated optical devices and systems comprising arrays of such devices and, more specifically, to the use of photorefractive materials for analog optical storage and other applications of optical neuromorphic systems. While the present disclosure is not necessarily limited to such applications, various aspects of the disclosure may be appreciated through a discussion of various examples using this context.

Neural networks are conventionally implemented in software. However, a neural network may also be implemented in hardware. For example, a neural network may be implemented as a resistive processing unit (relying on crossbar array structures) or an optical neuromorphic system. A hardware-implemented ANN may be a physical machine that, different from a classic computer (e.g., general-purpose computer), is primarily and specifically designed to implement an ANN (for instance, for training and/or inference purposes). Synaptic elements used in crossbar array structures may conventionally include a memristive device (e.g., a phase-change memory device, a resistive random-access memory (RRAM), or a magnetic random-access memory (MRAM)).

In some instances, as discussed herein, a neural network may be implemented as an optical neuromorphic system. For example, a photonic computing system may be configured as an optical reservoir network. In some instances, analog storage and computation may be demonstrated using optical refractive index gratings written in photorefractive crystals.

In some embodiments, applications of ANNs may rely on large vector-matrix multiplication. These operations may be inefficient when performed using standard Von Neumann hardware. An improvement in speed and power consumption may be obtained by performing such operations in the analog domain, using a large cross-point array of N×M nodes, where each node locally stores one matrix coefficient and can be used to compute a multiply-add operation in parallel with all other nodes of the N×M array.

In some embodiments, the training of neural networks mostly relies on the backpropagation algorithm or variants thereof. Analog cross-point arrays may support all three large vector-matrix operations (forward evaluation, backward evaluation, and weight update) that may be required for the evaluation and training of such networks. In some instances, the computation nodes for an analog cross-point array are designed to allow a local analog storage of the multiplication coefficients with sufficient precision, as well as a mechanism to perform analog operations (e.g., multiply, multiply-add). For the training of neural networks, the locally stored multiplication coefficients may be able to be adjusted (both upwardly and downwardly) in small analog steps. For high-speed operation, short-cycle times may be needed for both the multiply-add and the memory adjust operations. Such nodes may, ideally, be designed in such a manner that they can be integrated into large arrays of nodes.

Several physical principles may be exploited to implement analog computation nodes. In the electrical domain, it may be conventional to store the multiplication coefficient in a memristive device (e.g., a tunable resistor). The "multiply" operation may rely on Ohm's law. Namely, a crossbar array structure conventionally includes N input lines and M output lines interconnected at junctions via N×M electronic devices, which may each include a memristive device. Voltage biases may be applied across input lines and the resulting currents may be read out at the output lines. The "add" operation may exploit Kirchhoff's law, whereby currents from all nodes are summed. The tunable resistor may be implemented using, for example, phase-change memory cells, resistive random-access memory (RRAM), static random-access memory (SRAM), or electro-chemical random-access memory (ECRAM). However, it has proven difficult to find material systems for tunable resistors that provide both analog storage with sufficient precision and stability, and a method for reliable up and down adjustments of the stored values in small steps.

In the optical domain, analog storage and computation has been demonstrated using optical refractive index gratings written in photorefractive crystals. This may allow both analog precision and small step up/down adjustments of the stored coefficients. Further, the integration into larger arrays of nodes may be demonstrated, whereby many refractive index gratings were superimposed in a single crystal. However, the optical implementations may be limited to bulk optical systems that do not lend themselves well to integration into computer systems.

Vector-matrix multiplications have also been demonstrated using an array of integrated optical tunable Mach-Zehnder interferometers. However, the matrix coefficients may be determined by the tuning voltages applied to the Mach-Zehnder elements, using an external electrical circuitry. This approach does not rely on a local storage of the matrix coefficients. Moreover, it does not provide any method to adjust all coefficients in parallel.

The present disclosure provides a computer-implemented method, system, and computer program product to use photorefractive material for analog optic storage and other applications of optical neuromorphic systems.

In some embodiments, the present invention is embodied as an integrated optical device. The device may include a pair of optical mode couplers (i.e., beam splitters), two pairs of optical ports, and a pair of arms. The pair of optical mode couplers may include a first optical mode coupler and a second optical mode coupler. The two pairs of optical ports may include a first optical input and a first optical output (each connected to the first optical mode coupler), and a second optical input and a second optical output (each connected to the second optical mode coupler). Moreover, each of the arms may be a waveguide optically connecting the first optical mode coupler to the second optical mode coupler, so as for the device to be configured as a Mach-Zehnder interferometer. Each of the arms may include a photorefractive material (e.g., barium titanate, gallium arsenide (semi-insulating), or iron-doped indium phosphide). The photorefractive material may be configured to respond to an optical interference pattern created by a periodic modulation of a refractive index of the photorefractive material (for instance, so as to change this refractive index by at least $10^{-7}$).

In some embodiments, the invention is embodied as an optical system. The system may include an integrated optical array and the array may include a set of integrated optical devices (such as described above). In the array, each of the optical devices may be connected (via at least one of its optical ports) to at least another one of the optical devices. The optical devices may be connected so as to form optical connections. Each of the connections may connect one optical output of a given optical device to one optical input of an optical device connected thereto. A subset of the optical devices may have one or two free ports (for instance, one free optical input, one free optical output, or both a free optical input and a free optical output). A free port may be a port that is not optically connected through any of the optical connections in the array. In some instances, the array may be formed as a planar array, whereby the peripheral optical devices may be partly connected only (the free ports serve to optically interact with the array).

In some instances, the system further includes one or more electromagnetic radiation sources configured to couple electromagnetic radiation into free optical inputs of the array. The system may also include a control unit configured to adjust an amplitude and a phase of electromagnetic radiation coupled into any of said free optical inputs (via the one or more radiation sources). A readout unit may be designed to detect electromagnetic radiation emitted from free optical outputs of the array.

In some embodiments, the invention includes a method of operating an optical system. The method may rely on an optical device or a system such as described above. Electromagnetic radiation may simultaneously be coupled into each of the first optical input and the second optical input of an optical device to obtain an optical interference pattern in the photorefractive material of each of the arms of the device and thereby cause a modulation of a refractive index of the photorefractive material of each of the arms.

The method may be carried out through a system including a set of integrated optical devices. Each optical device may be connected to another optical device through at least one of its optical ports, so as to form an integrated optical array of optical devices, as described earlier. In that instance, electromagnetic radiation may be simultaneously coupled into free optical inputs of the array to obtain an optical interference pattern in the photorefractive material of each arm of each device of the array, and thereby cause a periodic modulation of a refractive index of said photorefractive material.

For neuromorphic applications, electromagnetic radiation may be simultaneously coupled into free optical inputs according to inputs obtained from a processing unit.

In some instances, amplitudes and phases of radiation are coupled into at least a subset of the free optical inputs. The amplitudes may be set or modified according to inputs obtained from the processing unit (for example, in view of updating weight values of synaptic weights of an artificial neural network (ANN), for instance, according to any suitable automatic learning method). The optical signals' amplitudes and phases may be set prior to coupling radiation into the free optical inputs of the array, or modified while simultaneously coupling said radiation into the free optical inputs.

In some instances, free optical inputs and outputs of the array are selected (prior to setting the amplitudes and phases of the corresponding optical signals). The amplitudes and phases may be set according to inputs obtained from said processing unit. Moreover, electromagnetic radiation emitted by the selected optical outputs may be read out while setting said amplitudes and phases. Amplitudes of the detected radiation may then be interpreted as an array of values (e.g., a matrix or vector), typically at the processing unit.

All basic operations needed for ANN applications (for example, matrix vector product for forward evaluation, product of a transposed matrix and an error gradient vector for backward evaluation, and vector outer products for updating weights) may be performed with arrays of optical devices as described above.

Referring now to FIG. 1, an integrated optical device 100 is depicted, according to some embodiments. The integrated optical device 100 includes a pair of optical mode couplers 110 and 120, two pairs of optical ports 105 and 106 as well as 121 and 122, and a pair of arms 111 and 112. The pair of optical mode couplers 110 and 120 include a first optical mode coupler 110 and a second optical mode coupler 120. The mode couplers 110 and 120 may be multi-mode interference (MMI) splitters or directional couplers. In some instances, 3 dB couplers may be used. The optical mode couplers (110 and 120) may operate as beam splitters or beam combiners. They are referred to as "beam splitters" in the following, for simplicity. In some embodiments, each of the arms 111 and 112 includes a photorefractive material 113 and 114, respectively.

Figure 2:
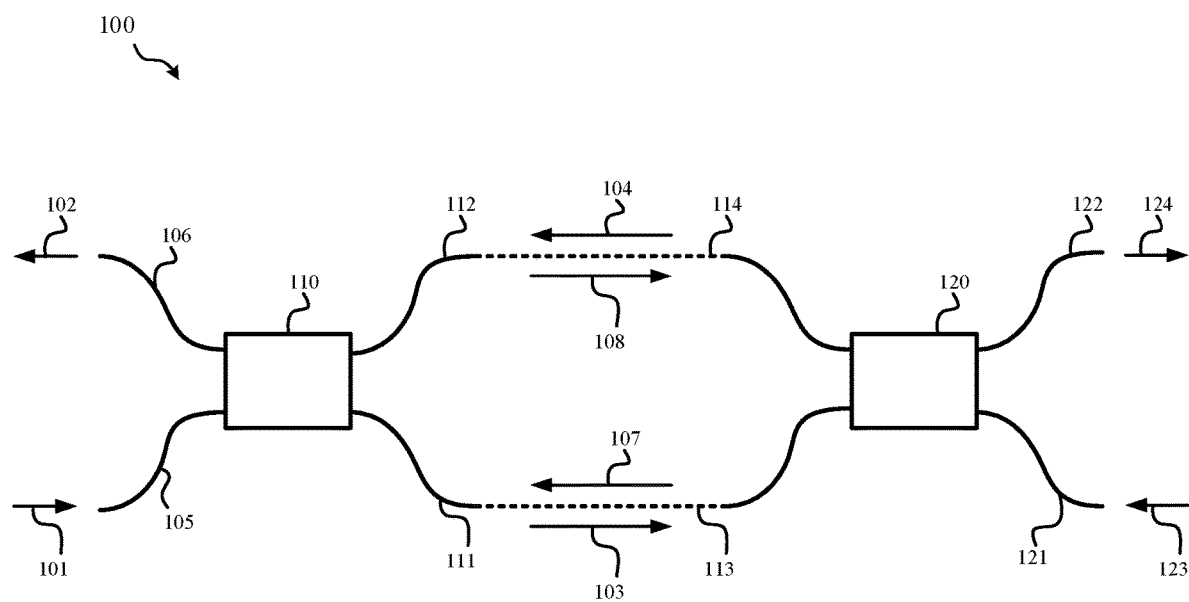
FIG. 2 depicts optical interference patterns of an integrated optical device, according to some embodiments.

Referring to FIG. 2, the optical inputs and outputs, as well as the optical movement (for example, movement of light) of integrated optical device 100 is depicted, according to some embodiments.

In some embodiments, the two pairs of optical ports include a first pair (105 and 106) at the first beam splitter 110. The first pair may include a first optical input 105 and a first optical output 106, each connected to the first beam splitter 110. Similarly, a second pair (121 and 122) is provided at the second beam splitter 120. That is, a second optical input 121 and a second optical output 122 may, each, be connected to the second beam splitter 120. The optical inputs 105 and 121 and the outputs 106 and 124 may each be formed as a waveguide, in some instances. In some embodiments, light may enter (101 and 123) at optical inputs 105 and 121. The light may exit (102 and 124) at optical outputs 106 and 124.

Each of the arms 111 and 112 may be a waveguide that optically connects the first beam splitter 110 with the second beam splitter 120. The arms 111 and 112 may be formed as distinct waveguides. In other words, the architecture of the arms 111 and 112 and the splitters 110 and 120 may be that of a Mach-Zehnder interferometer (MZI). The device 100 may thus include an MZI device realized in integrated optics. An integrated optics (or integrated optical) device may refer to a device containing several optical components combined in a single device so as to fulfil some function.

In some embodiments, each of the arms 111 and 112 includes a photorefractive material 113 and 114, respectively. This photorefractive material 113, 114 may be capable of providing a photorefractive response upon illuminating it with an optical pattern of modulated intensity, such as an optical interference pattern formed by coupling electromagnetic radiation in the first and second optical inputs 105 and 106 (e.g., the opposite input waveguides). In the present case, electromagnetic radiation (or simply radiation, for short) may refer to electromagnetic waves. The electromagnetic waves input into and output from device 100 may typically be in the visible or near-infrared spectrum (i.e., optical radiation). In variants, however, radiation in the far infrared or ultraviolet spectrum may be used.

In some embodiments, two mutually coherent beams (e.g., 101 and 123) are coupled into opposite inputs 105 and 121, respectively, thereby forming a standing wave. The photorefractive response obtained in each photorefractive material 113 and 114 may be characterized by a periodic modulation of the refractive index in each photorefractive material 113 and 114. In other words, this modulation may be obtained in response to illuminating the photorefractive materials (113 and 114) so as to create an optical interference pattern in the materials. This pattern may be obtained by coupling radiation into each of the first optical input 105 and the second optical input 121 of the optical device 100. This way, the photorefractive materials 113 and 114 may form diffraction gratings. The photorefractive material (113, 114) may be chosen so as to respond to the optical interference pattern created therein by creating a periodic modulation. The amplitude may also depend on the time duration during which the optical interference pattern is maintained, since the response of the photorefractive material is dynamic and thus may evolve over time. The device 100 may allow for a counter-directional grating coupling, which may be advantageously exploited for analog storage of values and in turn, to perform basic analog operations.

In some instances, the integrated optical device 100 may be used as a basic node of a neuromorphic optical system 700 (FIG. 7), discussed further herein. The optical device 100 and the system 700 (FIG. 7) may work in the electromagnetic (e.g., optical) domain. The materials 113 and 114 may be processed such that the resulting gratings have a same phase and a same amplitude (in each of the arms 111 and 112). Diffraction gratings written in the photorefractive materials 113 and 114 may be used for analog storage of, for example, matrix coefficients (with high-resolution). In some instances, up and down adjustments of the stored values may be allowed, in small steps, which may be difficult to achieve using tunable electrical resistors (e.g., memristors) in crossbar array structures.

A cross-point node may be realized in integrated optics technology, which may be cascaded into larger on-chip arrays, unlike previous approaches based on the photorefractive effect that were limited to bulk optical implementations. Besides the local photorefractive memory in every cross-point node, cross-point arrays based on the integrated optical device 100 may support all three vector-matrix operations required for neural network training—forward evaluation, backward evaluation, as well as parallel weight update. Each operation may require just a single cycle for processing the complete matrix.

In some embodiments, the photorefractive materials 113 and 114 may include barium titanate (BaTiO3), semi-insulating gallium arsenide (i.e., GaAs with EL2 deep traps), or iron-doped Indium phosphide (InP:Fe). All such materials are examples of suitable materials, which may combine deep traps and Pockels coefficients as needed to obtain a photorefractive material 113 and 114. The same materials may be used in each arm 111 and 112, identically structured in each of the arms.

Apart from the photorefractive material 113 and 114, the arms 111 and 112 may, for instance, comprise silicon or any other waveguide material (e.g., silicon nitride (SiN)). In some instances, each arm may entirely be formed as a photorefractive material.

In some embodiments, present methods (for example, as discussed herein in reference to FIG. 7) may require one or more optical devices 100 (for instance, each configured to include an MZI) whose arms 111 and 112 may each comprise a photorefractive material 113 and 114. Such methods may rely on simultaneously coupling radiation (e.g., 735, FIG. 7) into each of the first optical input 105 and the second optical input 121 of the optical device 100. This may make it possible to obtain an optical interference pattern in the photorefractive material 113 and 114 of each of the arms 111 and 112 of the device 100, and may thereby cause a periodic modulation of the refractive index of the photorefractive material 113 and 114 of each of the arms 111 and 112, as described herein. This may permit locally storing "values" in the device 100.

The same approach may be expanded to a system including multiple, connected devices. Before describing the operation of such a system, first consider the example of a single device. In the case of a classical, symmetric device (e.g., optical device 100) (without photorefractive arms, not shown), for instance including an MZI device, when light enters on the lower left port (101), the splitter 110 may divide the optical power equally over the arms, but with an added phase shift of π/2 for light in the upper arm. The contributions from the two arms may again be split in the second power splitter 120 and may interfere, leading to destructive interference at the lower right port 121, whereas constructive interference may be obtained at the upper output 122. Thus, light may exit 124 at the upper output 122. Similarly, light entering on the lower right port 121 may exit 102 at the upper left port 106.

Consider now the case of an optical device 100, for instance including an MZI device, with photorefractive waveguide sections 113 and 114, as shown in FIG. 2. Inputting light (101 and 123) on both lower ports 105 and 121 (i.e., the input ports) may cause counter propagating beams in the MZI arms 111 and 112, and may lead to standing waves in the MZI arm sections 113 and 114. Thus, it may be possible to temporarily "write" persistent refractive index gratings in both MZI arm sections 113 and 114 through the photorefractive effect, a phenomenon that can be exploited to store, for example, a weight value w. The gratings may have the same phase and amplitude in both arms. The phase and amplitude of the gratings may be determined by the phases and amplitudes of the writing beams and by the writing period.

Figure 3:
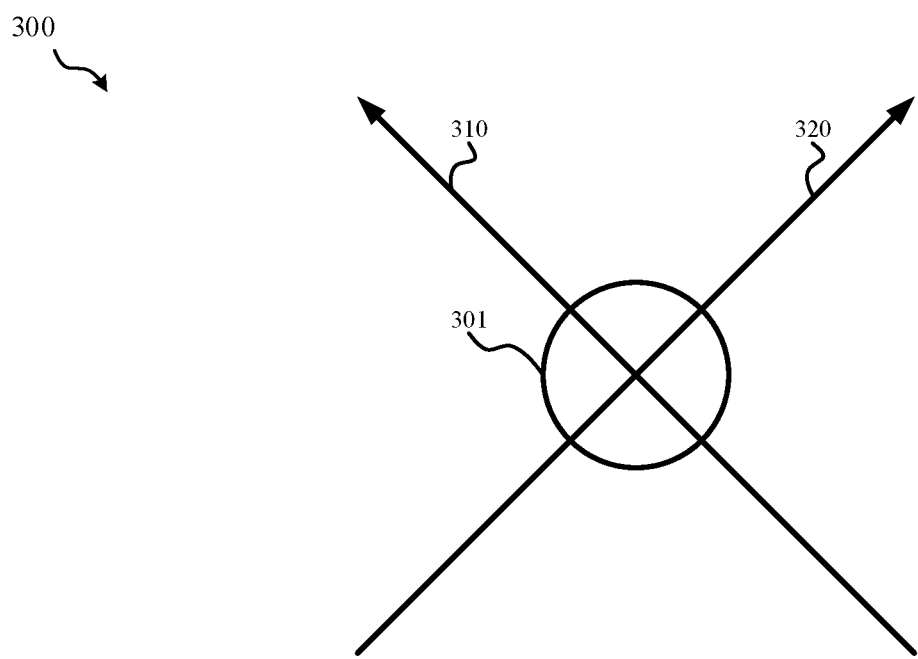
FIG. 3 depicts a schematic diagram of an analog weight update operation, according to some embodiments.

Referring now to FIG. 3, a schematic diagram of an analog weight update operation 300 is depicted, according to some embodiments. The analog weight update may be a large vector-matrix operation, in some instances. Node 301 may be a node within a neural network (e.g., ANN). In some instances, node 301 may correspond to optical device 100. The two input signals from optical device 100, at input 105 and input 121, may correspond to vectors 310 and 320. In some embodiments, vector 310 corresponds to the first input 105 (FIG. 1 and FIG. 2) and vector 320 corresponds to the second input 121 (FIG. 1 and FIG. 2). That the two input signals (310 and 320) may be set, for instance, their amplitudes and phases may be set according to values x and δ, respectively. Value x may correspond to 310 and value δ may correspond to 320. The amplitude of the standing waves in the MZI arm sections may be proportional to δ·x (i.e., δ multiplied by x) and a corresponding refractive index grating may be added to the previously existing grating. The weight update for the node may be proportional to a product of the two input signals (e.g., inputs 105 and 121 (FIGS. 1 and 2)). The weight update may be determined by the equation w=w'+δ·x, where w is the weight value. In some instances, a previously stored value (e.g., a locally stored weight value) may be updated according to w=w'+δ·x. The previously stored weight value may be w' in the equation.

Figure 4:
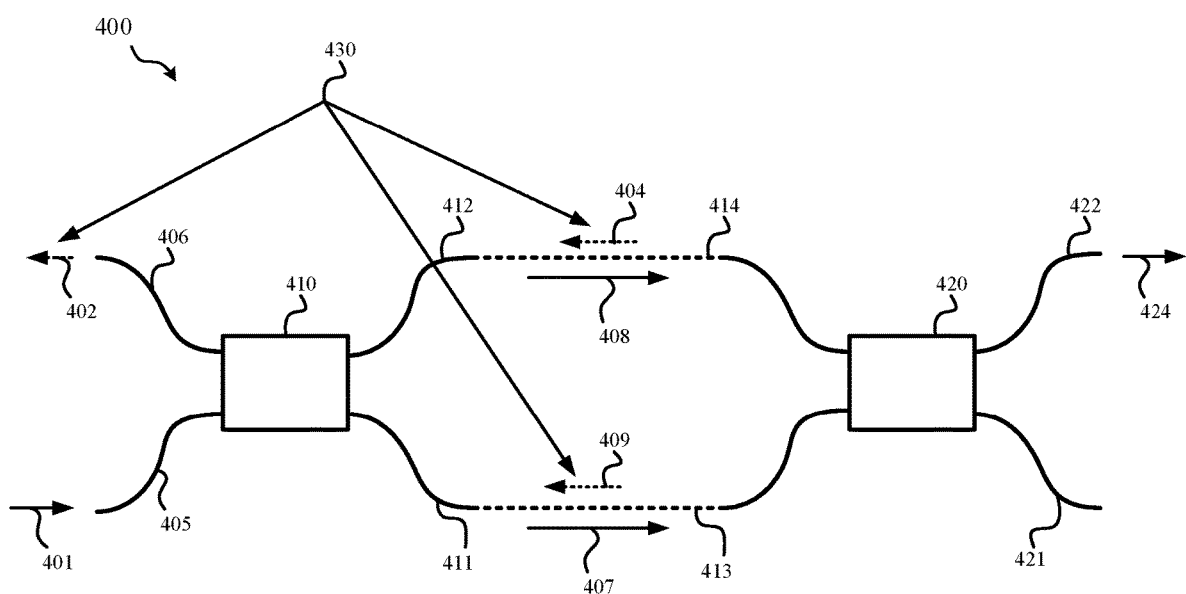
FIG. 4 depicts an integrated optical device with a reflected signal, according to some embodiments.

Referring to FIG. 4, an integrated optical device 400 with a reflected signal 430 is depicted, according to some embodiments. Integrated optical device 400 may correspond with integrated optical device 100 (FIG. 1 and FIG. 2). Integrated optical device 400 includes a pair of optical mode couplers 410 and 420, two pairs of optical ports 405 and 406 as well as 421 and 422, and a pair of arms 411 and 412. The pair of optical mode couplers 410 and 420 include a first optical mode coupler 410 and a second optical mode coupler 420. Light may be inputted 401 to a lower port, such as first input, or port, 405. In some instances, the light inputted 401 to optical device 400 is greater than an amount of light inputted 101 in FIG. 2. Part of the light may be reflected on the gratings in the optical device (e.g., MZI) arms 411 and 412, and the reflected light 430 recombines constructively in the upper output 406 of the left splitter 430. The light inputted 401 through input, or port, 405 may travel through the optical device 400 via (407) arm 411 and via (408) arm 412. The light may be outputted 424 through optical port 422. The reflected light 430 may reflect off of photorefractive waveguide sections 413 and 414, and may travel in the direction of 409 and 404 (respectively). The reflected light may be outputted 402 through optical port 406.

Figure 5:
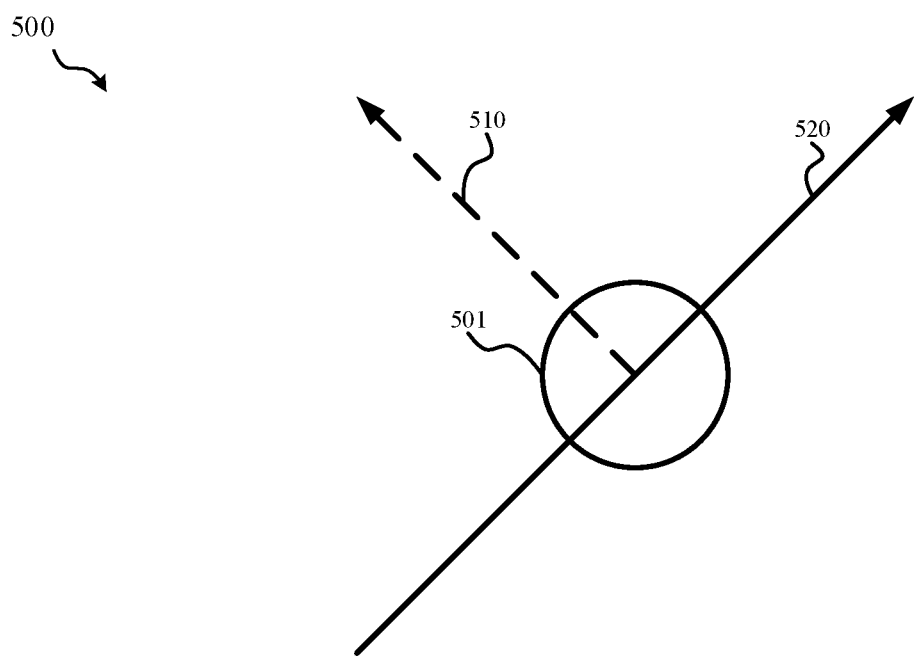
FIG. 5 depicts a schematic diagram of an analog multiply operation, according to some embodiments.

FIG. 5 depicts a schematic diagram of an analog multiply operation 500 for optical device 400 (FIG. 4), according to some embodiments. The analog multiply operation 500 includes a vector 520 corresponding to the inputted light 401. The amplitude of the additional input light 401 may be represented by variable x. The analog multiply operation 500 further includes a vector 510 corresponding to the reflected light 430. In some instances, the amplitude of the reflected light (at the output port 402 (FIG. 4)) is proportional to the amplitude x of the additional input light and the amplitude w of the diffraction grating. The result (e.g., total outputted light) may be proportional to w·x, which may be exploited to read the result of an analog multiply operation 500.

Figure 6:
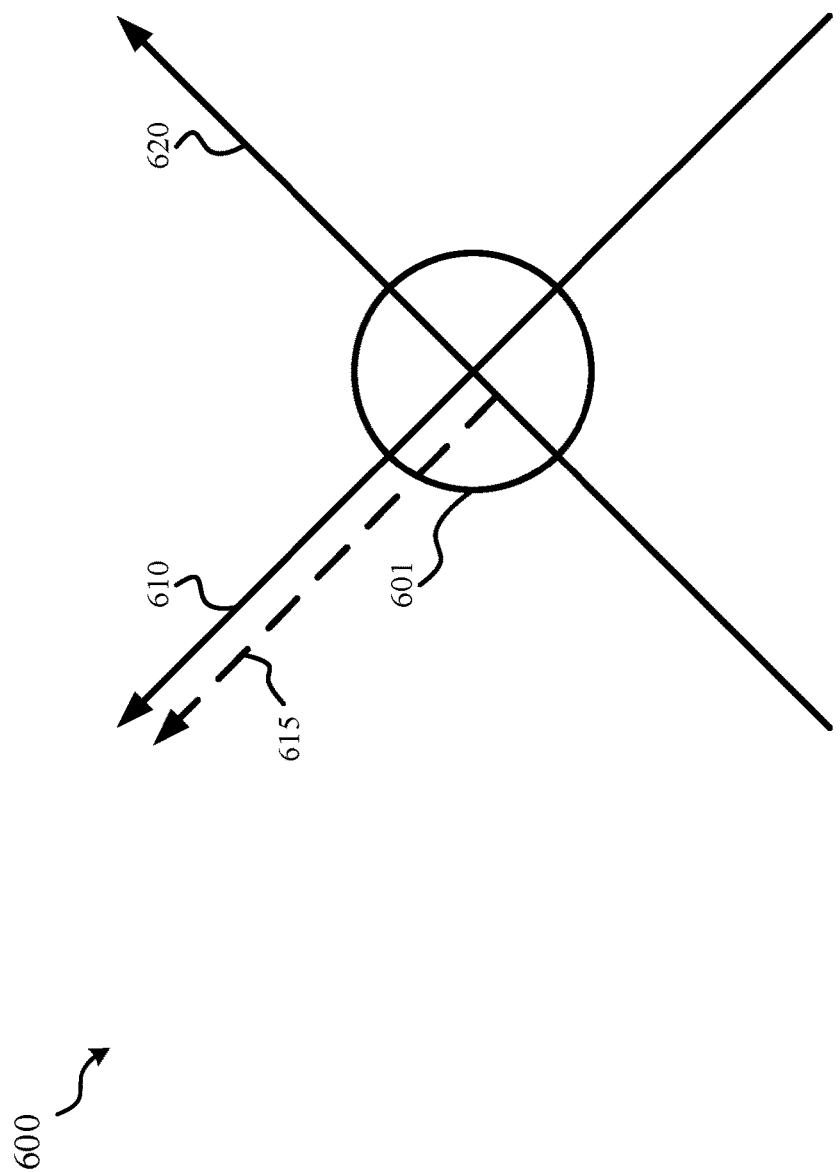
FIG. 6 depicts a schematic diagram of an analog multiply-add operation, according to some embodiments.

FIG. 6 depicts a schematic diagram of an analog multiply-add operation 600, according to some embodiments. In an exemplary embodiment, an additional signal may enter input port 421 (FIG. 4). Analog multiply operation 500 (FIG. 5) may have determined the signals for optical device 400 without any light input through port 421. If additional light is inputted through input port 421, the additional light may be added to the analog multiply operation 500 (FIG. 5), and may become multiply-add operation 600. Vector 620 may correspond to vector 520 (FIG. 5) and may represent the inputted light 401 (FIG. 4). Vector 620 may correspond to variable x, in some instances. Weight value 601 may correspond to weight 501 (FIG. 5), in some embodiments. Vector 615 may correspond to vector 515, and may represent the reflected light 430 (FIG. 4). The additional light inputted through port 421 may be represented by the vector 610, and may be represented by the variable y. The added signal y (610) entering the other input port 421 (FIG. 4) may add to the previous multiply operation 500 (FIG. 5) to give a result (e.g., total output signal) of y+w·x. In some instances, the signal y (610) may be diffracted on the grating, and therefore the actual output signals may more precisely be written as (1−w)·y+w·x for the top left output (406 (FIG. 4)) and (1−w)·x+w·y for the top right output (422 (FIG. 4)).

Figure 7:
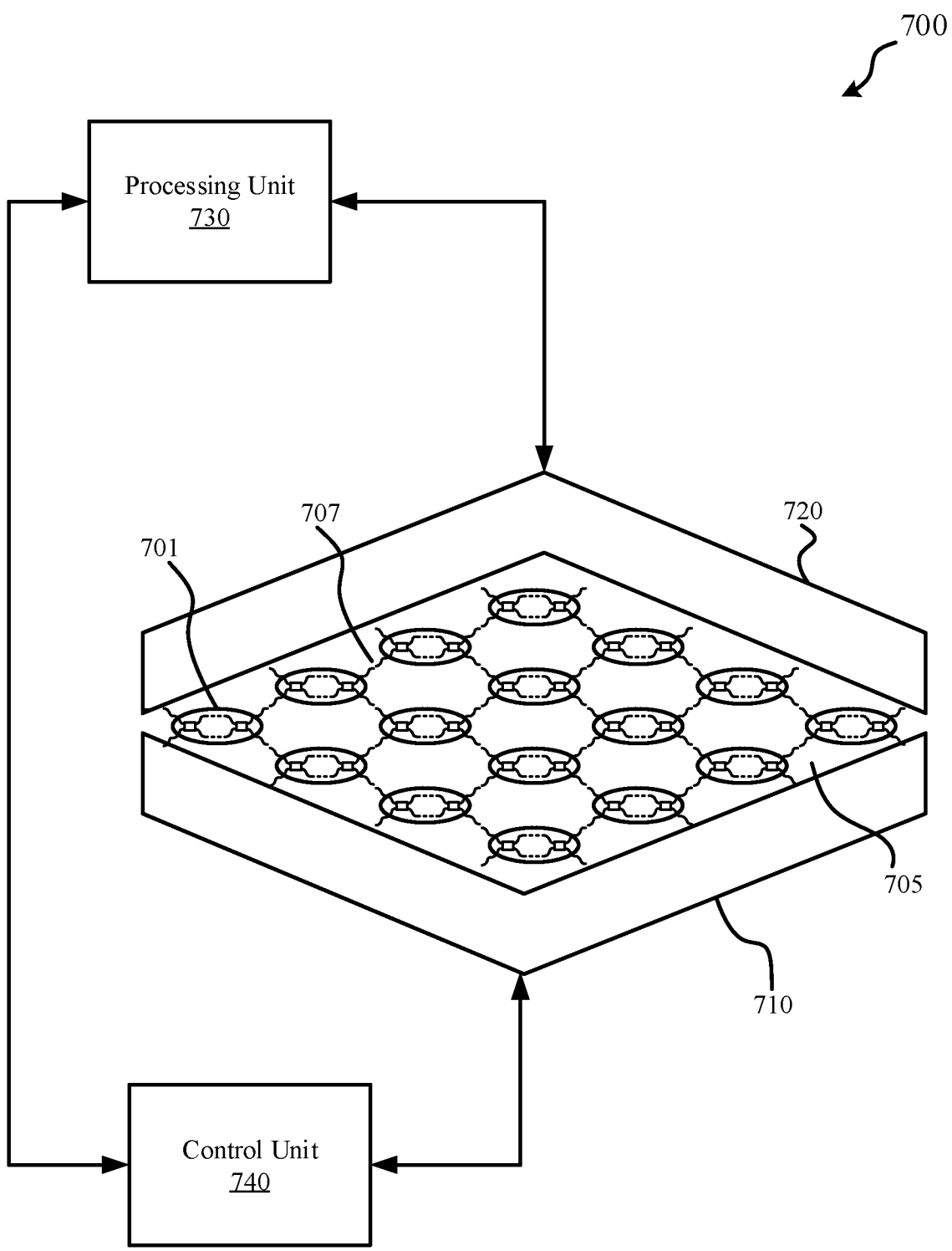
FIG. 7 depicts a schematic diagram of a neuromorphic optical system, according to some embodiments.

Referring to FIG. 7, a schematic diagram of a neuromorphic optical system 700 is depicted, according to some embodiments. The system 700 may include an integrated optical array 705 of integrated optical devices 701. Each integrated optical device 701 may be identical to the device 100 of FIG. 1 and FIG. 2, in some embodiments. Each of the optical devices 701 may be connected to another device 701 via at least one of its optical ports. In some instances, the devices 701 may be connected so as to form connections 707 that connect each optical output (e.g., 106 and 122 (FIG. 1 and FIG. 2)) of a given device 701 to one optical input (e.g., 105 and 121 (FIG. 1 and FIG. 2)) of the device it connects to. Connections 707 may be formed as waveguides, in some embodiments. In some embodiments, one or more of the optical devices 701 may correspond to optical device 400 (FIG. 4).

In some embodiments, not all devices are identically connected in the array. The extent in which the devices 701 are connected to other devices may depend on the positions of the nodes. In particular, a subset of the devices 701 may have one or two free ports (i.e., ports that do not connect to another device in the array). In some instances, the free ports are, for each device concerned (i.e., the peripheral devices), either one optical input 105 or 121 (FIGS. 1 and 2), one optical output 106 or 122, or both one optical input 105, 121 and one optical output 106, 122. A "free port" may be a port that is not optically connected via any optical connections 707 in the array 705. Thus, a "free optical output" or a "free optical input" may refer to an output or an input that is not connected by any connection 707, as defined above, in the array 705.

In some embodiments, the array 705 may be formed as a planar array of optical devices 701, using integrated optics technology. In this instance, inner optical devices 701 may be fully connected (i.e., via all of their optical ports) to other devices 701, while peripheral devices of the array 705 may be only partly connected to other nodes. That is, in a 2D arrangement such as shown in FIG. 7, the outer devices may have free ports, while innermost devices may be connected to other devices via all of their ports. With the convention chosen in FIG. 1 and FIG. 2 (where inputs are formed at the lower ports), the inputs 105 and 121 of the lowermost devices are free, thereby providing exploitable inputs 105 and 121 to operate the array (for example, as an ANN), while the outputs 106 and 122 of the uppermost devices are free. This may also mean that the outermost lateral devices have, each, one input 105 (or 121) and one output 106 (or 122) that are not connected. The input-output pair concerned may be on a same splitter.

In variants to 2D arrays, linear chains may be contemplated as well (not shown). In such cases, one output 106 or 122 of any of the optical devices (but the last) may connect to one input 105 or 121 of the immediately connected device.

In some embodiments, the system 700 further comprises one or more radiation sources 710, a control unit 740, and a readout unit 720. The radiation sources 710 may be configured to couple radiation into free optical inputs (e.g., 105 and 121) of the array 705. The control unit 740 may be configured to adjust (i.e., set or modify) amplitudes and phases of radiation coupled into any of the free optical inputs (e.g., 105 and 121), via the radiation sources 710. Each free optical input of the array may thus receive an optical signal whose amplitude is individually set or modified. The control unit 740 may be used to select the active sources 710, should distinct sources be used. The readout unit 720 may be designed to selectively detect radiation emitted from free optical outputs (e.g., 106 and 122) of the array 705. The system 700 may, in some instances, comprise a processing unit 730 (for example, a unit comprising analog and/or digital components).

By simultaneously coupling radiation into free optical inputs (e.g., 105 and 121) of the array 705, an optical interference pattern in the photorefractive material (e.g., 113 and 114) of each of the arms (e.g., 111 and 112) of the devices 701 of the array 705 may be obtained. This may result in a modulation of the refractive index of the photorefractive material (e.g., 113 and 114) in each of the devices 701, where light from both inputs is present. In some instances, radiation may at least partly be concomitantly coupled into the free optical inputs.

The amplitudes and phases of radiation coupled in the input ports of the array 705 may be set or modified (by control unit 740) so as to store desired weight values in each of the devices 701. The amplitudes and phases may be selected according to values (or signals) obtained by a processing unit 730. Such values may relate to synaptic weights of an ANN. That is, the array 705 may be used to store synaptic weights of the ANN, as necessary for training this ANN or performing inferences therewith. Such weights may be captured by optical interference patterns formed in the optical devices 701 (for example, including MZI devices). The weights may differ from one device 701 to the other, in some instances, hence a possible need to suitably select amplitudes and phases of signals coupled into input ports of the array 705 (i.e., input ports corresponding to free ports in the array 705) and to individually tune the amplitudes and phases. In some instances, the array 705 may, more generally, be used as an analog optic memory.

The processing unit 730 may comprise one or more analog circuits, and/or one or more digital circuits. An all-analog circuit may avoid lengthy analog-digital conversions, therefore increasing the efficiency.

A single array 705 of connected nodes 701 may embody a single layer of nodes of an ANN. More precisely, the array 705 may provide synaptic interconnects for a single layer of the ANN, which may allow a compute intensive portion to be performed, as the number of computations scale quadratically with the number of neurons per layer. To achieve a fully functional ANN layer, an activation function may be necessary. An activation function may be a nonlinear function enabling a "firing decision" for the neuron when weighted and summed signals from all source neurons past a certain threshold. This function may be performed in the analog or digital domain. This function may, in some instances, be performed by the processing unit 730.

Repeated interactions with the processing unit 730 may be needed for it to store, process, and communicate values as necessary to perform operations from one layer to the other (for example, using a backpropagation algorithm). Eventually, the array 705, together with the units 730 and 740, may allow a fully functional ANN to be implemented.

In some instances, the unit 730 may include a digital processing unit for processing values and computing updates as well as a memory (e.g., a SRAM), to store values as necessary to compute such updates. However, all basic operations may be performed using the array 705, in some instances. The processing unit 730 may provide inputs (for example, as to given weight values or error gradient vectors to update the weights), in some instances. Such inputs may be used to couple optical signals into the ANN (for instance, to evaluate the ANN, be it for learning or inference purposes). The unit 730 may further interpret output signals detected by the readout unit 720, in some instances.

In order to perform such operations, radiation coupled into optical inputs of the array may be individually set. In some embodiments, the amplitudes and phases of radiation coupled into optical inputs of the array 705 may be individually modified (while already coupling radiation into said inputs). Such amplitudes and phases may be set or modified (i.e., adjusted) according to inputs obtained from the processing unit 730.

The above process may be used to update weight values of an ANN, for example, in small steps. In some embodiments, all weight coefficients may be adjusted in parallel.

In some embodiments, a subset (at least) of free optical inputs and a subset (at least) of free optical outputs of the array 705 will first be selected prior to setting or modifying amplitudes and phases of the correspondingly selected signals. The "free" ports may correspond to the free ports of the array, as indicated herein. Thus, amplitudes and phases as subsequently set or modified may concern radiation provided in output(s) of the control unit 740, and may be coupled into the subset of optical inputs selected. Meanwhile, in some instances, radiation emitted by the selected subset of optical outputs are detected. The optical signals detected may be interpreted as an array 705 of values (for example, a vector). In some embodiments, the output signals may first be locally processed at the readout unit 720 or forwarded to the processing unit 730 for it to interpret the outputs.

Figure 8:
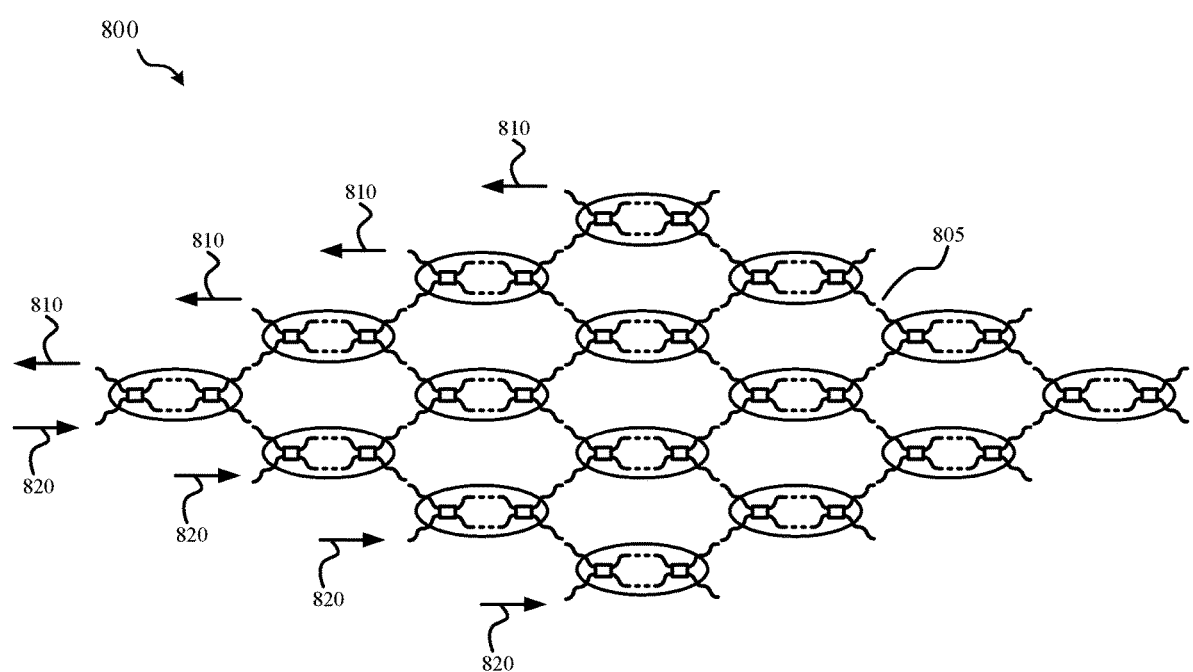
FIG. 8 depicts a schematic diagram of a first example optical array environment, according to some embodiments.
Figure 9:
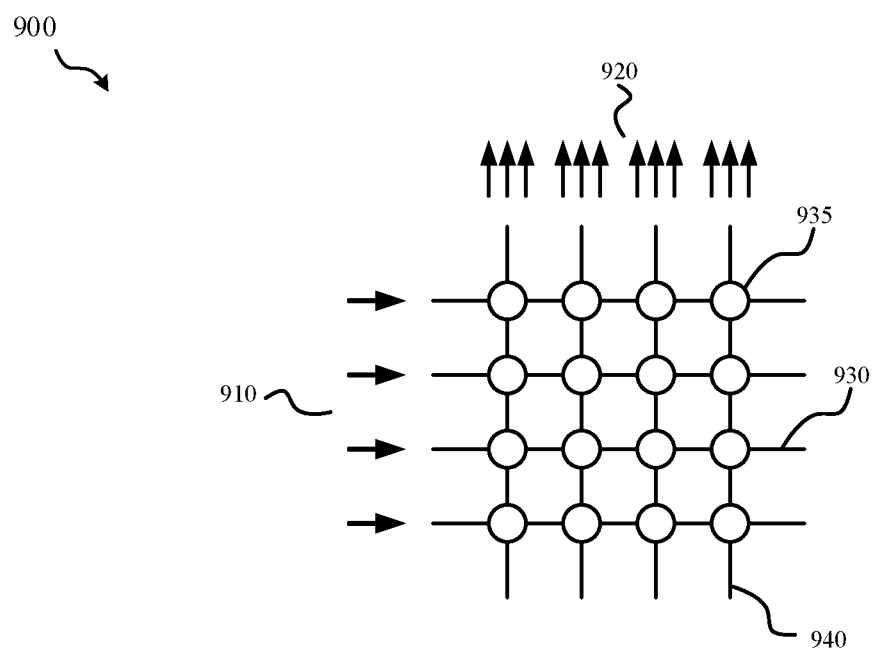
FIG. 9 depicts a schematic diagram of a first example crossbar array structure, according to some embodiments.

Referring now to FIG. 8, a schematic diagram of an optical array environment 800 is depicted, according to some embodiments. Optical array environment 800 includes a first subset of optical inputs 820, a second subset of optical outputs 810, and an array 805 of optical devices. Array 805 may correspond to array 705 (FIG. 7). In some instances, a first subset of optical inputs 820 and a second subset of optical outputs 810 may be selected in view of performing a matrix vector product. FIG. 9 depicts a schematic diagram of a matrix vector product corresponding to optical array environment 800.

Referring to FIG. 9, the schematic diagram of a crossbar array structure 900 is depicted, according to some embodiments. The crossbar array structure 900 includes a plurality of nodes 935 in the matrix. In some instances, each node may be an optical device. The crossbar array structure 900 further includes crossbars 930 and 940.

In array 805 (FIG. 8), the input and output subsets selected may be chosen so as to correspond to the lower left inputs 820 and the upper left outputs 810 of the array 805. Thus, amplitudes and phases of radiation that are being coupled in the first subset of inputs 820 selected may be set according to a given input vector 910. The input vector(s) may correspond to the variable $\vec{x}$. In some embodiments, input vector 910 has been obtained from the processing unit 730 (FIG. 7). Meanwhile, amplitudes and phases of radiation emitted by the second subset of optical outputs 810 (FIG. 8) may be detected by the readout unit 720. Such output amplitudes and phases may then be interpreted as a matrix-vector product 920. The matrix-vector product may be represented by the variable $W\vec{x}$. In some embodiments, $\vec{y} = W\vec{x}$.

Figure 10:
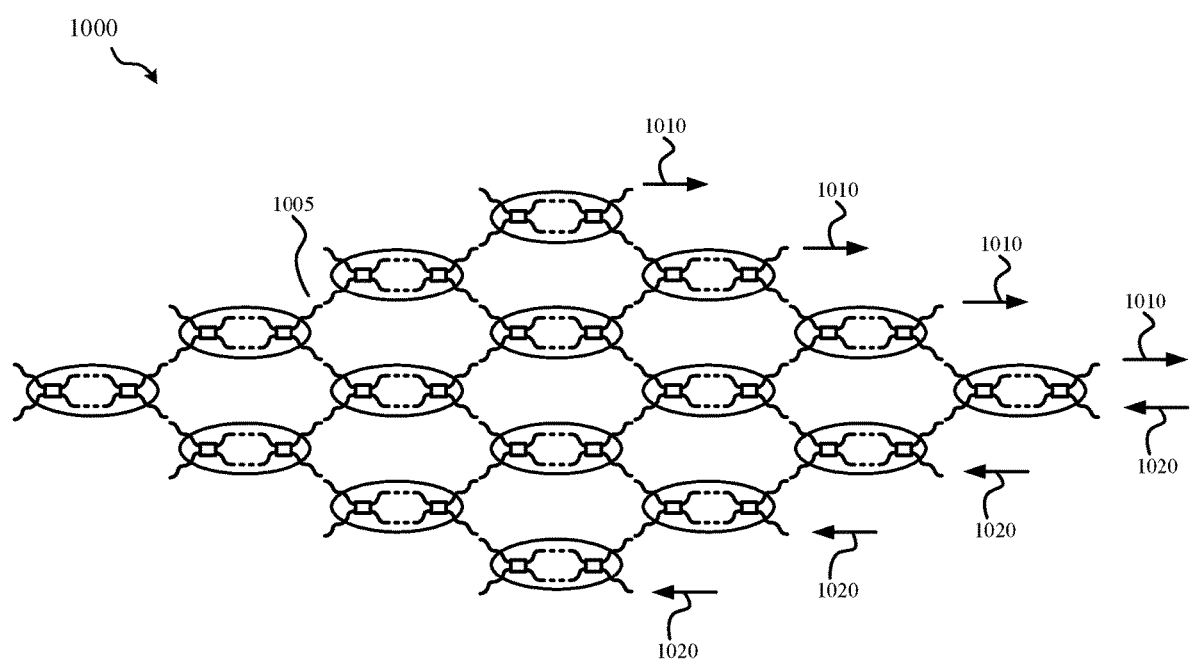
FIG. 10 depicts a schematic diagram of a second example optical array environment, according to some embodiments.

Referring to FIG. 10, a schematic diagram of an example optical array environment 1000 is depicted, according to some embodiments. Optical array environment 1000 includes a first subset of optical inputs 1020, a second subset of optical outputs 1010, and an array 1005 of optical devices. In some embodiments, array 1005 corresponds to array 705 (FIG. 7). In array 1005, the input subsets 1020 and the output subsets 1010 may be chosen so as to correspond to the lower right inputs 1020 and the upper right outputs 1010 of the array 1005.

Figure 11:
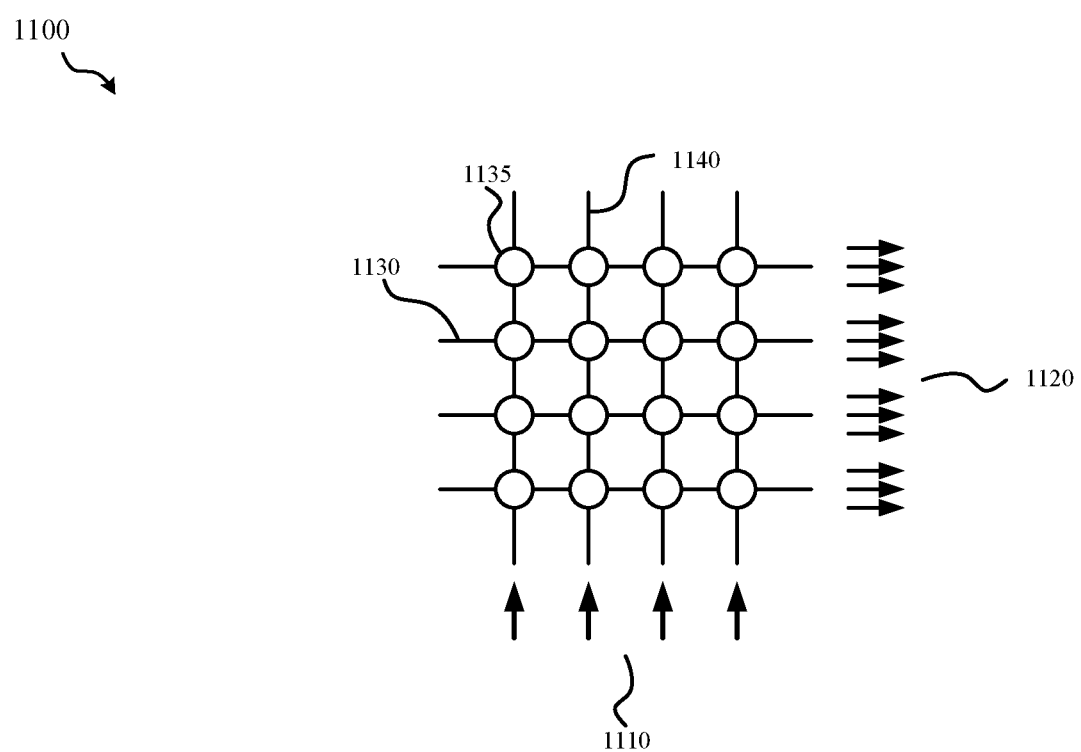
FIG. 11 depicts a schematic diagram of a second example crossbar array structure, according to some embodiments.

Referring now to FIG. 11, a schematic diagram of a crossbar array structure 1100 is depicted, according to some embodiments. crossbar array structure 1100 includes a plurality of nodes 1135 in the matrix. In some instances, each node may be an optical device. The crossbar array structure 1100 further includes crossbars 1130 and 1140.

In some instances, first subset of optical inputs 1020 and a second subset of optical outputs 1010 of the array 1005 (FIG. 10) may have been selected in view of performing a product of the transpose of the weight matrix and an error gradient vector (i.e., $\vec{b} = W^T \vec{\delta}$), for a given layer. Amplitudes and phases corresponding to the selected inputs may be set according to an error gradient vector 1110, which may be obtained from processing unit 730 (FIG. 7). The error gradient vector 1110 may correspond to variable $\vec{\delta}$. In some instances, the selected inputs and outputs (i.e., 1020 and 1010 of FIG. 10) work as if a transpose $W^T$ of the weight matrix were at work in that case. Thus, the output amplitudes and phases read out may be interpreted as a matrix-vector product 1120 $W^T \vec{\delta}$ of the transposed matrix $W^T$ by the error gradient vector $\vec{\delta}$.

Figure 12:
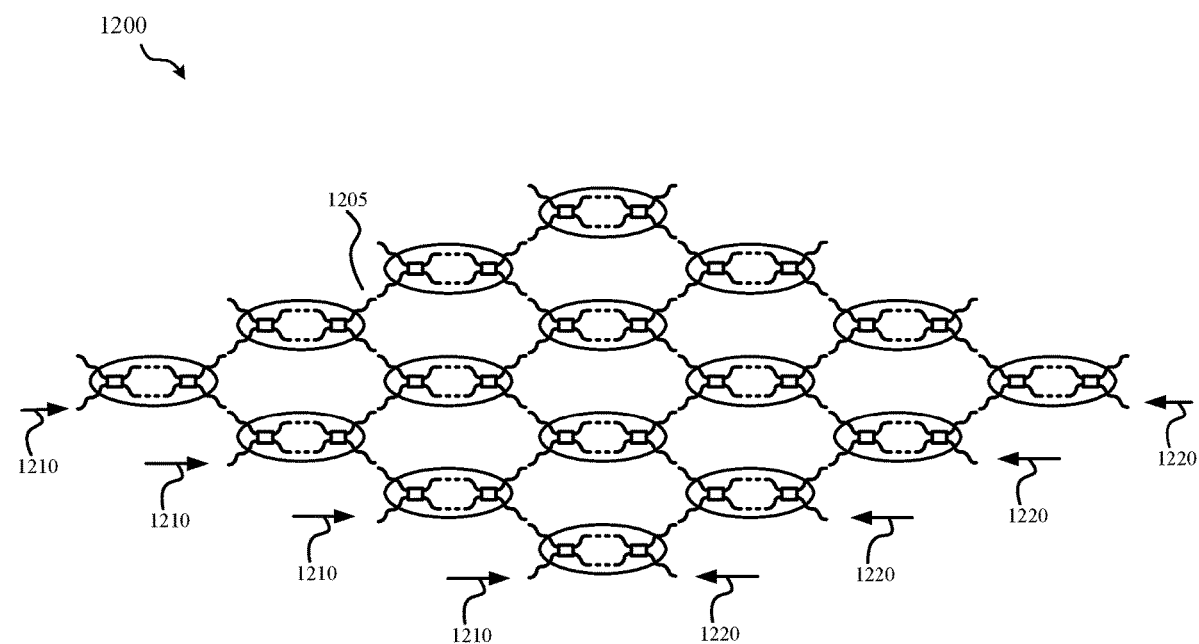
FIG. 12 depicts a schematic diagram of a third example optical array environment, according to some embodiments.

Referring to FIG. 12, a schematic diagram of an example optical array environment 1200 is depicted, according to some embodiments. Optical array environment 1200 includes a first subset of optical inputs 1220, a second subset of optical outputs 1210, and an array 1205 of optical devices. In some embodiments, array 1205 corresponds to array 705 (FIG. 7). In array 1205, the input subsets 1220 and the output subsets 1210 may be chosen so as to correspond to the lower right inputs 1220 and the lower left inputs 1210 of the array 1205. In some instances, the first subset of optical inputs 1220 and the second subset of optical inputs 1210 are selected in view of performing a vector outer product.

Figure 13:
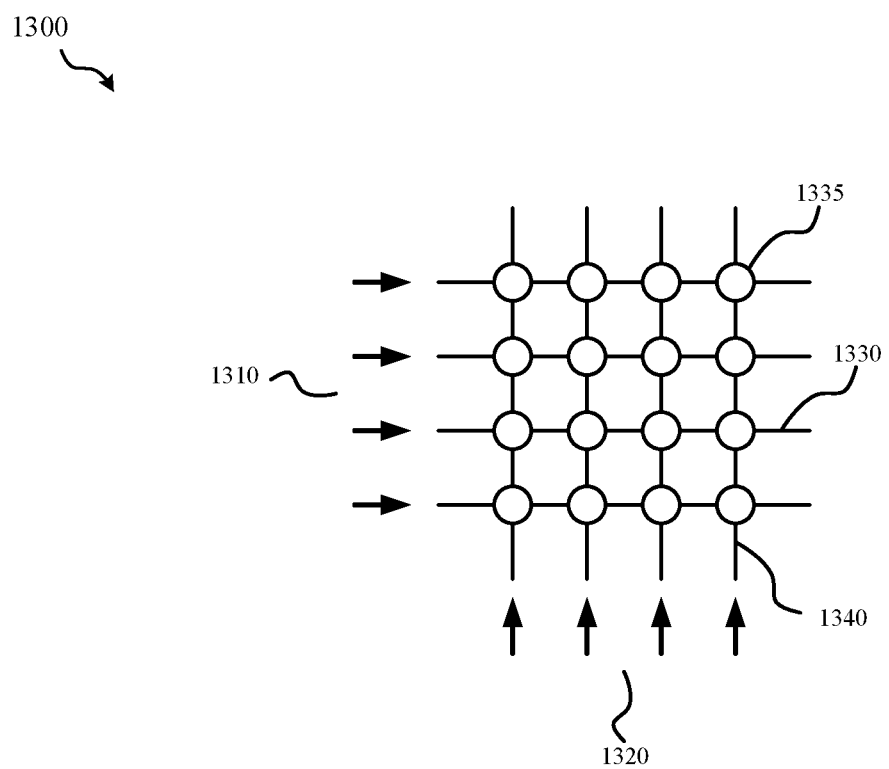
FIG. 13 depicts a schematic diagram of a third example crossbar array structure, according to some embodiments.

Referring now to FIG. 13, a schematic diagram of a crossbar array structure 1300 is depicted, according to some embodiments. crossbar array structure 1300 includes a plurality of nodes 1335 in the matrix. In some instances, each node may be an optical device. The crossbar array structure 1300 further includes crossbars 1330 and 1340.

In some embodiments, all the optical inputs 1210 and 1220 (FIG. 12) may be selected in view of performing a vector outer product (in view of updating weights, for example, according to $\Delta w_{ij} = -\eta x_i \delta_j$). The amplitudes and phases may be modified based on an error gradient vector 1320 ($\vec{\delta}$) and an input vector 1310 ($\vec{x}$), as obtained from the processing unit 730 (FIG. 7). Due to the selected ports (i.e., all input ports), the weight updates in the array may correspond to a vector outer product.

In some embodiments, all necessary operations (matrix-vector multipliers, matrix transpose, for backward propagation, and vector outer products, for weight update) may be performed using an array (e.g., 705, 805, 1005, and/or 1205). The array depicted in FIGS. 7, 8, 10, and/or 12 may amount to a 4×4 crossbar array. However, the array, in use in integrated optics technology, may be cascaded into much larger on-chip arrays.

In some embodiments, in feedforward linear layers, the weights may be initialized randomly. After having initialized the model at random, the unit 730 may check the performance of the network. Starting from some inputs x $\vec{}$ (corresponding to, for example, a test set used to learn the weights), such inputs may be passed through the network layers to compute the actual outputs of the model. To computer the actual outputs of the mode, a matrix vector product (e.g., as depicted in FIG. 9) and operations to perform a matrix vector product may be performed in a repeated manner for each layer (forward propagation). This may provide an actual output of the initial random network.

In some embodiments, a desired output is available for the network to learn (supervised learning). Any suitable loss function may be invoked. The goal may be to minimize this function, using differentiation (i.e., to predict how much of the total error will change the internal weights of the neural network with small values $\delta$). This is where backpropagation operations (e.g., FIG. 11) may be used. For instance, starting from the loss function, errors may be propagated back from the end to the start, using a library of differentiable functions for each layer. This, in turn, may allow a small-steps update of the weight matrix to be inferred (e.g., FIG. 13). In some embodiments, these operations may be carried out for each layer, resulting in back and forth communication with the processing unit 730 (FIG. 7).

Figure 14:
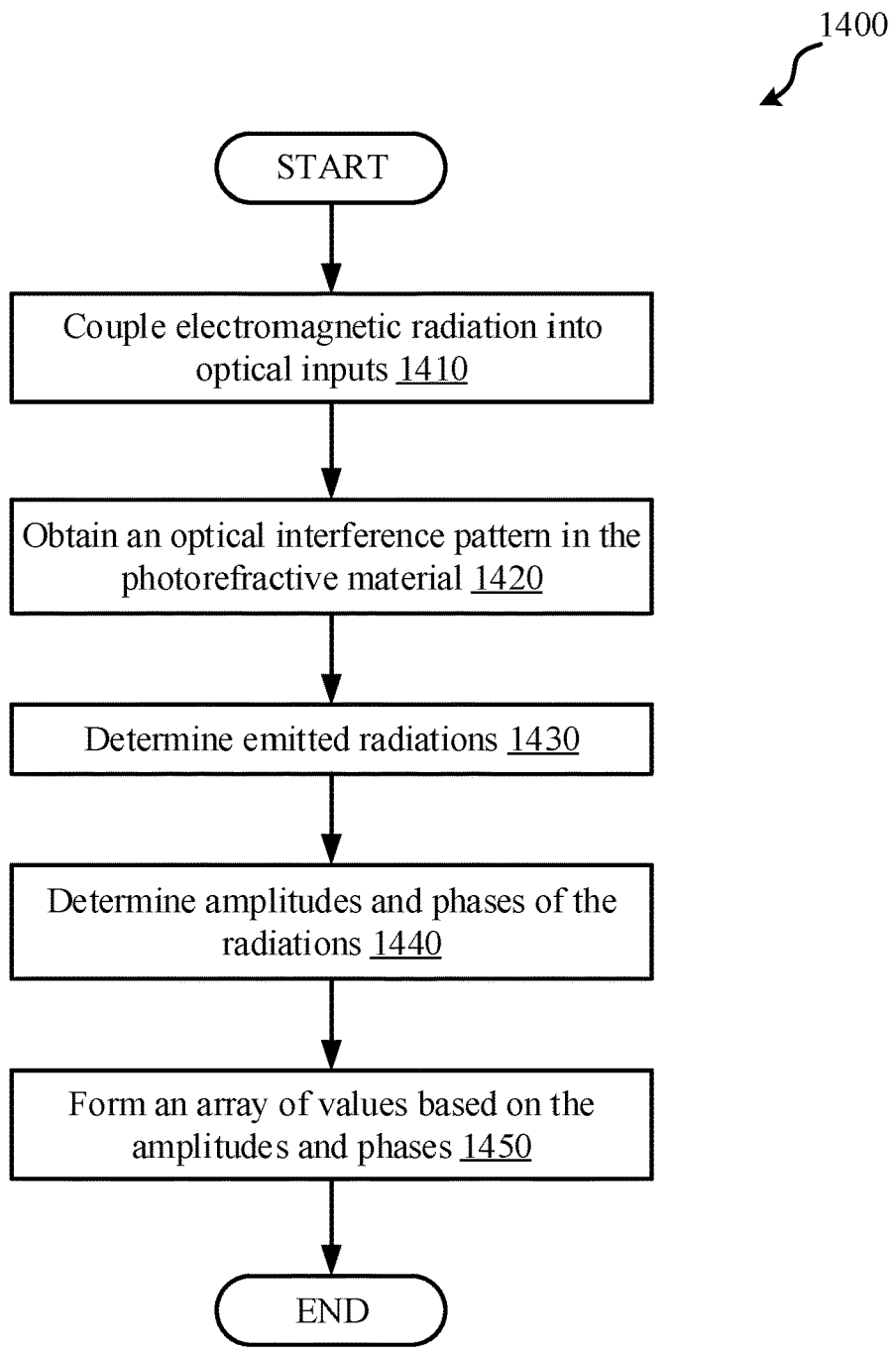
FIG. 14 depicts a flowchart of a set of operations for using photorefractive materials for applications of optical neuromorphic systems, according to some embodiments.

Referring now to FIG. 14, a flowchart illustrating a method 1400 for using photorefractive materials for applications of optical neuromorphic systems is depicted, according to some embodiments. In some embodiments, method 100 is depicted by neuromorphic optical system 700 (FIG. 7).

Method 1400 includes operation 1410 to couple electromagnetic radiation into optical inputs. In some embodiments, the electromagnetic radiation is coupled into each of a first optical input and a second optical input. The first optical input and the second optical input may be part of an integrated optical device (e.g., integrated optical device 100, 400, and/or 701). The integrated optical device may be part of an array of optical devices (e.g., 705 (FIG. 7)). In some instances, electromagnetic radiation is coupled from electromagnetic radiation sources into free optical inputs of the array of integrated optical devices.

Method 1400 includes operation 1420 to obtain an optical interference pattern in the photorefractive material of each arm of the integrated optical device. In some embodiments, electromagnetic radiation may simultaneously be coupled into each of the first optical input and the second optical input of an optical device to obtain an optical interference pattern in the photorefractive material of each of the arms of the device and thereby cause a modulation of a refractive index of the photorefractive material of each of the arms.

In some embodiments, method 1400 includes operation 1430 to determine radiation emitted by the first optical output and the second optical output. Once electromagnetic radiation is coupled into the inputs, electromagnetic radiation may be emitted by the outputs. In some embodiments, method 1400 includes operation 1440 to determine amplitudes and phases of the radiation. In some embodiments, method 1400 includes operation 1450 to form an array of values (for example, a matrix or vector) based on the amplitudes and the phases of the radiation. The operations of method 1400 may occur in different orders, in some instances. For instance, operations 1430-1450 may occur before operation 1420.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   coupling electromagnetic radiation into each of a first optical input and a second optical input, wherein the first optical input and the second optical input are part of an integrated optical device, the integrated optical device comprising:
   a first optical mode coupler connected to a first pair of optical ports, wherein the first pair of optical ports comprises a first optical input and a first optical output;
   a second optical mode coupler connected to a second pair of optical ports, wherein the second pair of optical ports comprises a second optical input and a second optical output, and
   the first optical mode coupler connected to the second optical mode coupler using a pair of arms, wherein each arm comprises a photorefractive material; and
   obtaining an optical interference pattern in the photorefractive material of each arm of the integrated optical device by simultaneously coupling the electromagnetic radiation into the first optical input and the second optical input.

2. The method of claim 1, wherein the first optical input and the second optical input are free inputs.

3. The method of claim 2, further comprising:
   modifying amplitudes and phases of the electromagnetic radiation; and
   updating, based on the modifying, weight values of synaptic weights of an artificial neural network.

4. The method of claim 1, further comprising:
   determining radiation emitted by the first optical output and the second optical output;
   determining amplitudes and phases of the radiation; and
   forming an array of values based on the amplitudes and the phases of the radiation.

5. The method of claim 1, wherein the radiation are coupled into the first optical input and the second optical input based on inputs obtained from a processing unit.

6. The method of claim 1, wherein the integrated optical device is part of an array of integrated optical devices.

7. A computer program product comprising a computer readable storage medium having program instructions embodied therewith, the program instructions executable by a server to cause the server to perform a method, the method comprising:
   coupling electromagnetic radiation into each of a first optical input and a second optical input, and wherein the first optical input and the second optical input are part of an integrated optical device, the integrated optical device comprising:
   a first optical mode coupler connected to a first pair of optical ports, wherein the first pair of optical ports comprises a first optical input and a first optical output;
   a second optical mode coupler connected to a second pair of optical ports, wherein the second pair of optical ports comprises a second optical input and a second optical output, and the first optical mode coupler connected to the second optical mode coupler using a pair of arms, wherein each arm comprises a photorefractive material; and obtaining an optical interference pattern in the photorefractive material of each arm of the integrated optical device by simultaneously coupling the electromagnetic radiation into the first optical input and the second optical input.

8. The computer program product of claim 7, wherein the first optical input and the second optical input are free inputs.

9. The computer program product of claim 8, further comprising:

modifying amplitudes and phases of the electromagnetic radiation; and updating, based on the modifying, weight values of synaptic weights of an artificial neural network.

10. The computer program product of claim 7, further comprising:

determining radiation emitted by the first optical output and the second optical output; and determining amplitudes and phases of the radiation; and forming an array of values from the amplitudes and the phases of the radiation.

* * * * *